US012166625B2

(12) United States Patent
Mishra (10) Patent No.: US 12,166,625 B2
(45) Date of Patent: Dec. 10, 2024

(54) VIDEO TRANSPORT STREAM STABILITY PREDICTION

(71) Applicant: iStreamPlanet Co., LLC, Las Vegas, NV (US)

(72) Inventor: Nachiketa Mishra, Fremont, CA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 0 days.

(21) Appl. No.: 17/899,460

(22) Filed: Aug. 30, 2022

(65) Prior Publication Data

US 2022/0417084 A1 Dec. 29, 2022

Related U.S. Application Data

(63) Continuation of application No. 17/124,372, filed on Dec. 16, 2020, now Pat. No. 11,438,218.

(51) Int. Cl.
*H04L 41/0677* (2022.01)
*H04L 41/0631* (2022.01)
*H04L 65/61* (2022.01)
*H04L 65/80* (2022.01)

(52) U.S. Cl.
CPC ...... *H04L 41/0677* (2013.01); *H04L 41/0636* (2013.01); *H04L 65/61* (2022.05); *H04L 65/80* (2013.01)

(58) Field of Classification Search
CPC . H04L 41/0677; H04L 65/4069; H04L 65/80; H04L 41/0636
See application file for complete search history.

(56) References Cited

U.S. PATENT DOCUMENTS

| 9,924,404 | B1* | 3/2018 | Salour ................ H04L 65/80 |
| 10,440,087 | B2* | 10/2019 | Báder ............ H04L 43/0829 |
| 10,977,711 | B1* | 4/2021 | Verma ................ G06F 18/231 |
| 11,165,848 | B1 | 11/2021 | Larson |
| 2012/0188882 | A1* | 7/2012 | Wilkinson ......... H04N 21/6473 370/252 |
| 2013/0279326 | A1* | 10/2013 | Dunne ................ H04L 41/147 370/228 |

(Continued)

FOREIGN PATENT DOCUMENTS

| EP | 1103114 B1 * | 11/2008 | ............. G06F 11/08 |
| WO | WO-2017144506 A1 * | 8/2017 | ............. H04L 65/80 |

OTHER PUBLICATIONS

Advisory Action, U.S. Appl. No. 17/124,370, Jul. 7, 2022, 4 pages.
(Continued)

*Primary Examiner* — Jonathan A Bui
(74) *Attorney, Agent, or Firm* — Bookoff McAndrews, PLLC (57) ABSTRACT

A method of measuring video stream visual stability, the method including receiving a first set of network packets carrying data of the video stream, determining network performance metrics for a session associated with the first set of network packets, retrieving priority fault errors from a packet header of at least one network packet of the first set of the network packets, adding the priority fault errors and the network performance metrics to time series data, and applying a machine learning model to the time series data to obtain a visual stability score for the first set of network packets.

20 Claims, 6 Drawing Sheets

(56) References Cited

U.S. PATENT DOCUMENTS

| | | | |
|---|---|---|---|
| 2013/0297780 A1* | 11/2013 | Sturrock | H04L 47/2416 |
| | | | 709/224 |
| 2016/0366202 A1 | 12/2016 | Phillips et al. | |
| 2017/0272465 A1* | 9/2017 | Steele | H04L 63/1466 |
| 2021/0160262 A1* | 5/2021 | Bynum | H04L 43/16 |

OTHER PUBLICATIONS

ETSI Technical Report 101 290 V1.3.1 (Jul. 2014), "Digital Video Broadcasting (DVB); Measurement guidelines for DVB systems," ETSI, EBU, Jul. 2014, pp. 1-174.
Final Office Action, U.S. Appl. No. 17/124,370, May 5, 2022, 12 pages.
Final Office Action, U.S. Appl. No. 17/124,372, Mar. 8, 2022, 14 pages.
Jonathan Stickel, "Data smoothing and numerical differentiation by a regularization method", Oct. 21, 2009, Computers and Chemical Engineering, 34, pp. 467-475 (Year: 2009).
Non-Final Office Action, U.S. Appl. No. 17/124,370, Jan. 14, 2022, 8 pages.
Non-Final Office Action, U.S. Appl. No. 17/124,372, Oct. 14, 2021, 13 pages.
Notice of Allowance, U.S. Appl. No. 17/124,372, May 3, 2022, 7 pages.
Notice of Allowance, U.S. Appl. No. 17/124,370, Aug. 31, 2022, 12 pages.

* cited by examiner

VIDEO TRANSPORT STREAM STABILITY PREDICTION

CROSS-REFERENCE TO RELATED APPLICATIONS

This application is a continuation of application Ser. No. 17/124,372, filed Dec. 16, 2020, which is hereby incorporated by reference.

TECHNICAL FIELD

The embodiments of the invention are related to the field of managing video and image content. More specifically, the embodiments of the invention relate to methods and systems for determining the stability of a video stream transport stability in real time.

BACKGROUND ART

Many technologies related to the delivery of video streams are defined by various standards such as the standards of digital video broadcasting (DVB). DVB standards are maintained by the DVB Project, an international industry consortium, and are published by a Joint Technical Committee (JTC) of the European Telecommunications Standards Institute (ETSI), European Committee for Electrotechnical Standardization (CENELEC) and European Broadcasting Union (EBU). Video streaming and similar technologies can be transmitted over a variety of media including satellite, cable, terrestrial television, microwave and similar media.

Standards, such as the DVB standards, for the distribution of video streams can define the physical layer and data link layer of the distribution system. Video data is transmitted in defined formats such as motion pictures experts group (MPEG) transport streams. Video streams can be encoded using various discrete cosine transform (DCT) based encoding standard, such as, H.26x, MPEG and similar encoding schemes. Audio for the video streams can be encoded using modified DCT (MDCT) standards including advanced audio coding (AAC), Dolby Digital (AC-3), MP3 and similar encoding formats.

DVB and similar standards can also define standards for measurement of analysis for transport streams, such as ETSI technical report (TR) 101 290 (herein after "ETR 101"). Transport stream measurement and analysis standards such as ETR 101 can define how metrics and errors in the transport stream are reported and managed. However, these standards have limitations in the information provided and do not provide any predictive indication of video stream stability or characteristics.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

Figure 1A:
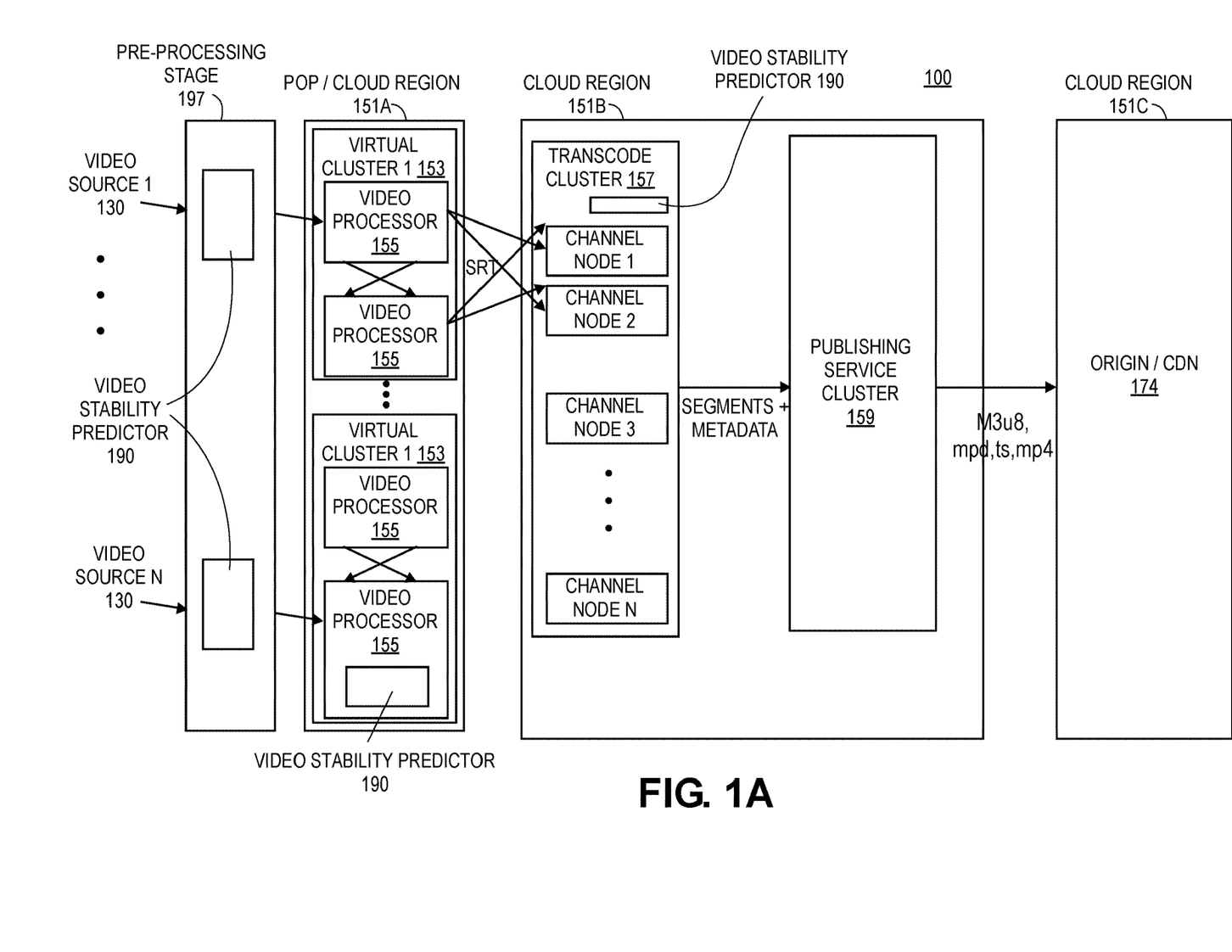
FIG. 1A is a diagram of one embodiment of a video streaming system supporting video stability prediction.

FIG. 1A is a first embodiment of a video streaming system to support video stability prediction in a cloud computing environment. The cloud computing environment can include a set of cloud regions 151A-C. A 'set,' as used herein can refer to any whole number of items including one item. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the video streaming system 100. In some embodiments, some of the components of the video streaming system 100 are located in a set of electronic devices referred to as a point of presence (POP). The POP 151A can be provided by an internet service provider or similar interface through which external resources and electronic devices can interact with the cloud computing environment.

In an example embodiment, the video streaming system 100 includes a pre-processing stage 197, set of virtual clusters 153, a transcode cluster 157, and a publishing service cluster 159. The pre-processing stage 197 can be composed of any number and combination of electronic devices including servers, storage devices, networking devices and related devices that make up a cloud or similar distributed computing environment. The pre-processing stage 197 can support a set of processors that can operate on the input video sources 130. These processors can be software components that process the incoming video sources 130 and are hosted by any type or distribution of electronic devices. The processors can perform tasks associated with each video source 130 to process that video source and can be considered as a separate stage or can be combined with other stages of the video streaming system 100. Each processor of the stage 197 can perform a single task or multiple tasks and can operate in conjunction with other processes to pre-process the video sources 130. The processors can implement video stability prediction via video stability predictors 190 as well as perform any number of other processing tasks. Any number of the processors in the pre-processing stage 197 can support the video stability predictor function.

A pop/cloud region 151A can include a set of virtual clusters 153. Each cluster can be composed of any number and combination of electronic devices including servers, storage devices, networking devices and related devices that make up a cloud computing environment. The virtual clusters 153 can support a set of video processors 155. These video processors 155 can software components that process the incoming video sources 130 and are hosted by the virtual clusters 153. The video processors 155 can perform tasks associated with each video source 130 to process that video source and can be considered a unit of work or a worker in the video streaming system 100. Each video processor 155 can perform a single task or multiple tasks and can operate in conjunction with other video processors 155 to process the video sources 130. Any number of virtual clusters 153 can manage any number of video processors 155, which together can process any number of video sources 130. Video processors 155 can implement video stability prediction via video stability predictors 190 as well as perform any number of other video processing tasks. While a single video processor 155 is illustrated as providing a video stability predictor 190 any number of the video processors 155 can support this function.

Video sources 130 can be any type of video input in any format that is provided by any source device or set of devices. For example, video sources can be provided by a set of content providers, which are sets of devices operated by an entity that produces a video source 130 to be processed by the video streaming system 100. In some cases, the video sources 130 can be provided directly or indirectly by a set of capture devices such as live programming (e.g., sporting events). Any content provider, capture device, or similar set of devices providing the video sources 130 can execute or be in communication with a device executing a video stability predictor 190. A video stability predictor 190, as further described herein, analyzes a video stream to predict near term future stability (e.g., potential video stream failures or interruptions). This video stability predictor 190 process can be implemented at any number of points within the video streaming system 100 such that contextual information about the video can be utilized in making decisions and taking actions associated with the video source 130.

The output of the video processors 155 can be provided to a transcode cluster 157. The transcode cluster 157 can further process the video sources to organize the video sources into a set of channels handled by associated channel nodes 125. The transcode cluster 157 and channel nodes 125 can combine video sources from the video processors 155 and encode the resulting video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of video streams that are to be published to a content distribution network 174 or in some cases returned to an origin server (e.g., a video source provider or other entity that may publish the video stream). In some embodiments, the transcode cluster 157 can output the video streams as segments and associated metadata. In some embodiments, the publishing service can format the video streams using video encoding formats M3u8, MPD, TS, MP4 and similar video encoding formats. As used herein video, audio/video, and similar terms are used interchangeably to include video formats that may also encompass audio aspects.

As shown in FIG. 1A, a set of video stability predictors 190 can be executed at the transcode cluster 157 or between the transcode cluster 157 and the publishing service cluster 159. The video stability predictors 190 as described further herein, analyze incoming video stream information to generate a prediction of the future operation (i.e., stability) of the video stream. The prediction of future near term stability (e.g., in the range of milliseconds to hours) can be utilized to adjust the handling of the video stream in the video streaming platform 100. For example, if the stability of the video stream is predicted to have high latency or interruption, then the resources devoted to that video stream can be adjusted to maximize their use either by reassignment or by increasing resources to attempt to improve stability.

Figure 1B:
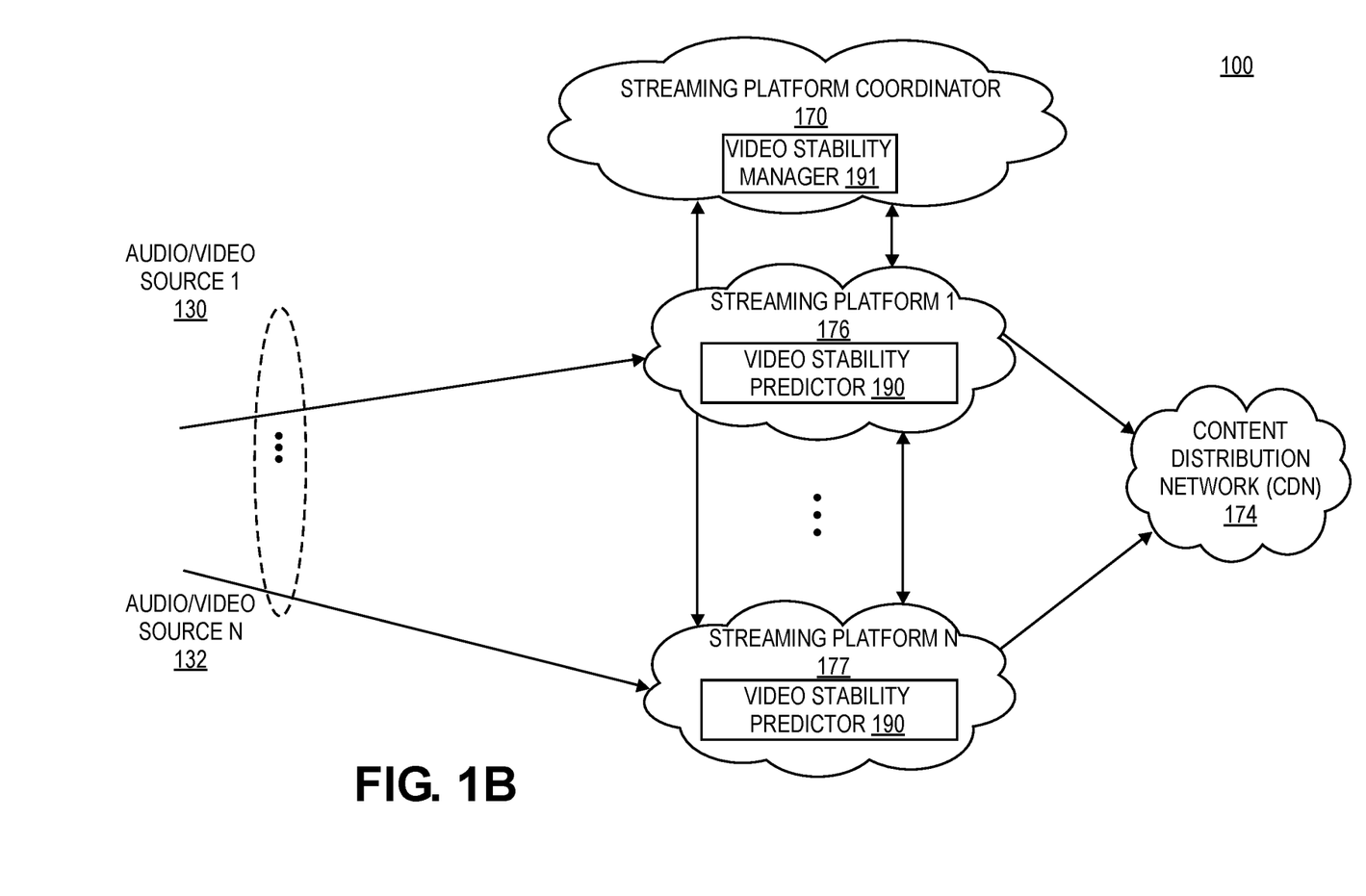
FIG. 1B is a diagram of another embodiment of a video streaming system containing multiple video streaming platforms.

FIG. 1B illustrates another embodiment of a video streaming system containing multiple video streaming platforms. A video streaming system 100 includes multiple video streaming platforms represented by a streaming platform 1 through a streaming platform N at references 176 and 177, a content distribution network 174, and a streaming platform coordinator 170.

The streaming platform coordinator 170 communicates with all the video streaming platforms including the streaming platforms 1 through N. The streaming platform coordinator 170 coordinates processing of the media contents routed to the various video streaming platforms. The processed media contents from the video sources are then published to the content distribution network 174.

It is to be noted that the various video streaming platforms and/or the streaming platform coordinator may be hosted by any one or more of various cloud computing providers. When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain a video stability predictor 190, which is illustrated as a video stability predictor 190 in streaming platforms 1-N, respectively. The video stability predictor 190 is to generate a prediction for a set of video streams as to their stability that can be updated as the video stream is received from the video sources, caused by processing media workflows created for video sources in a video streaming platform as discussed in more details herein below, or in similar processing of the received media (i.e., video) as it is received from the video sources, handled by the streaming platforms, and forwarded via the content distribution network 174.

In some embodiments, the streaming platform coordinator 170 may contain a video stability manager 191 that manages the video stability predictors 190 including configuration of the video stability predictors 190 as well as training or metric collection for the video stability predictors 190 from processing media workflows in all video streaming platforms the streaming platform coordinator 170 interacts with, and the streaming platform coordinator 170 may manage or coordinate notifying a feedback mechanism or corrective components to address any inaccuracies in the video stability prediction such that a retraining of the machine learning models associated with the video stability predictors can be initiated. The video stability manager 191 can also coordinate resources related to the video stability predictor 190 at different video streaming platforms. Where a feedback mechanism is available in the system 100 the video stability manager 191 or video stability predictor 190 can send notification of failures or context mismatches to the feedback mechanism that may report the issues component to retrain the machine learning models or to an administrator. In cases where corrective components are available in the system 100, then the reporting of issues with the video stability prediction can trigger machine learning model retraining and in some cases further processing to correct or ameliorate the identified video stability issues. The reporting of metrics related to video stability prediction can indicate the frequency, type, label, categorization, and similar information about the video stability prediction, identifying information about the media or video source and frames upon which the prediction has been generated as well as other relevant information for video stability management in the system 100.

Video Streaming Platform in a Cloud Computing Environment

A set of video streaming platforms is a main component of a video streaming system 100 as illustrated in FIG. 1B. The video streaming platforms 176 and the video streaming system 100 can perform any number of operations to process any number of input video sources 130-132 and output via a content distribution network 174 to reach any number of consuming devices and software applications. The operations performed on the video sources 130-132 can include the content generation process implemented by video stability predictor 190. Each streaming platform 176 can execute any number of video stability predictor 190s using workers or similar mechanism as described further herein. The video stability predictors 190 can operate on a per streaming platform 176, per video source 130-132 or similar basis.

Figure 2:
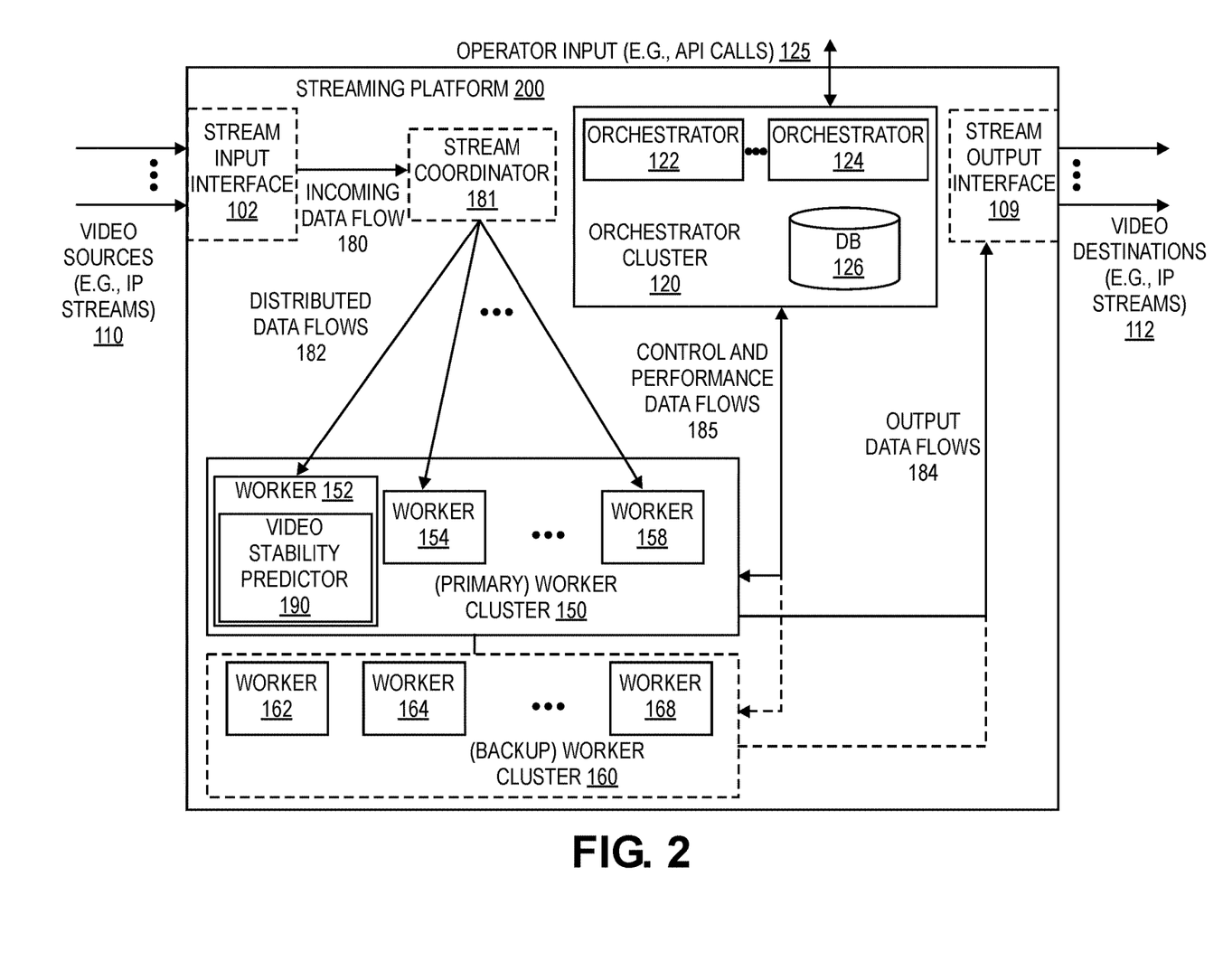
FIG. 2 is a diagram of one embodiment of one of the video streaming platforms in the video streaming system.

The architecture of the video streaming platform and its operations are discussed in more detailed discussion with relation to the additional figures. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally, the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD) and any other type or combination of pre-recorded audio/video content.

A video source may be "pushed" to the streaming platform 200 where the video source is IP packet streams such as the Moving Picture Experts Group (MPEG)-transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

It is to be noted that in some embodiments orchestrator cluster 120 also contains a content manager 191 or video stability predictor 190. The content manager 191 monitors the video stability predictors 190 in the streaming platform 200 through collecting data from the workers (e.g., the performance data collected along with the control flows, as the control and performance data flows illustrated at reference 185) and receives updates on content generation as they occur. As content information is generated, the content manager 191 and/or video stability predictor 190 can initiate a transfer of the content information to other components in the streaming platform 200 that may utilize or take action based on the context information (e.g., to an operator of the streaming platform 200 and/or to a streaming platform coordinator). While the content manager 191 is illustrated a standalone entity of the orchestrator cluster 120, the content generator 191 may be integrated with other entities such as orchestrators 122-124. Additionally, a portion of the video stability manager 191 may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing. The streaming platform 200 receives operator input 125 to the orchestrator cluster 120. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 125 may also receive input from an operator separately from the streaming platform coordinator 170. The operator may receive input in the form of API calls. One of the requests from the streaming platform coordinator is a request to create a workflow for a video source in the streaming platform 200. The request (may be referred to as a channel creation request) may contain a variety of parameters describing the video source and the expected operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Microsoft© PlayReady, Adobe© Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

A media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone mitigate any macroblock detected with regard to the processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or video encoders), thus cannot provide effective mitigation.

Operations of Video Stability Prediction in a Video Streaming Platform

The embodiments provide a process and system for video stability prediction. In particular, the embodiments provide transport stream stability prediction using temporal machine learning analysis based on priority faults reported in the video stream (e.g., faults of varying types and priority levels utilized in the MPEG transport stream (TS). The video stability predictor can perform the temporal analysis and prediction for each video transport stream managed by the video streaming platform. The video stability reliability can be determined using machine learning models with ETR 101 priority faults and seasonality patterns as features that are utilized by the machine learning models. The machine learning models can scale to predict video transport stream reliability over dynamic time windows in real time using long tail time series ETR 101 priority fault data.

The embodiments provide advantages over the prior art video stream monitoring processes and systems. Prior art monitoring systems use ETR 101 priority faults to monitor video transport streams. However, the priority faults only provide monitoring about current and past conditions and do not provide any analysis or prediction of the most probable failures in the near future. The embodiments provide such a prediction by analyzing historical transport streams priority faults and external seasonal stimuli that affect source reliability. Priority faults are recorded across time and the data by nature can be noisy. The number of priority faults provides a lot of data and finding patterns in the noisy data using manual statistical technologies is inefficient and difficult.

In the embodiments, the video stability predictor uses received priority faults, external seasonality stimuli, and video transport stream origin information to learn about the stability of the video transport stream over time. The embodiments derive statistical and stochastic features from priority faults. The video stability predictor uses feature parity, weight and efficacy to pick the most effective derived features to train a set of temporal machine learning models. These temporal machine learning models provide a probability score within a deviation margin across any dynamic time window. The embodiments further integrate stochastic thresholding to generate alerts on the probability score on a dynamic resolution window to provide video transport stream reliability prediction automatically across time.

The embodiments utilize machine learning to perform temporal analysis over the priority faults, seasonality stimuli, video transport stream origin, and similar features. In some embodiments, the machine learning is primarily based on priority faults. In other embodiments, the machine learning models incorporate weather, geographical origin of the source, internet paths taken, and similar features to make the machine learning model more robust. With more features, deep learning in the machine learning models increase the prediction time window and accuracy.

Figure 3:
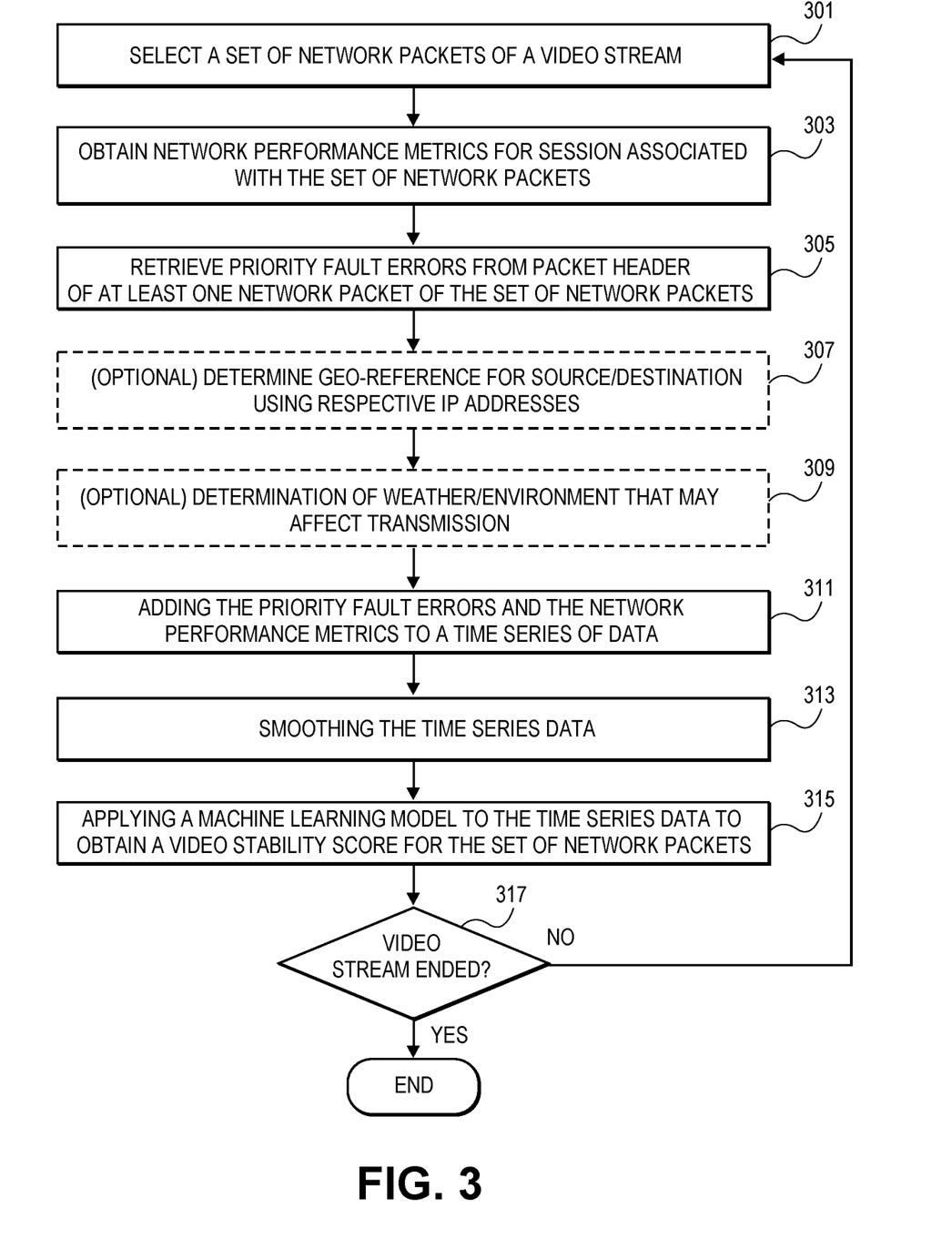
FIG. 3 is a flowchart of one embodiment of a process for executing a video stability predictor.

FIG. 3 is a flowchart of one embodiment of a process for predicting video stability. The process is illustrated at a high level to represent the overall function of the video stability prediction process in a video streaming system 100. The video streaming system 100 receives media (e.g., a video source or stream) from a content producer or similar video source and selects a set of network packets from the session transporting the video source to be processed (Block 301). A sequential processing of the network packets is illustrated by way of example for clarity and conciseness, however, one skilled in the art would appreciate that aspects of the process could be performed in parallel or in alternate order. A network packet can be any type of data encapsulation using any format or protocol. In the example embodiments, the network packets are part of a DVB standardized process. However, the embodiments are also applicable to other similar technologies. The video stream received from content producers can be encoded in any format and can have any size or organization. In some cases, the video stream can be formatted to satisfy legal agreements between content producers and content distributors who stream the media on their platform (e.g., via a content delivery network (CDN)) and/or to meet the technical requirements of the distributors who stream the media on their platform.

Input network packets can be processed individually, in sets, batches, or similar groupings. A set of network performance metrics can be obtained for the session associated with the selected network packets (Block 303). Network performance metrics can be collected from the embedded information in the session, reports from downstream devices, network management software in the video streaming platform, or similar sources. Network performance metrics that are collected can include latency, packet loss, jitter, bandwidth utilization, and similar metrics. Each selected network packet can be inspected to retrieve priority fault errors (e.g., ETR 101 priority faults) or similar information. The priority faults are part of the video stream parameters (e.g., Continuity_count_error which is part of the MPEG-TS packet). The ETR 101 priority faults indicate various errors in the transport stream.

In some embodiments, a source or destination of the network packet is examined to determine a location or geo-reference associated with either or both of the source or destination (Block 307). IP addresses of the source or destination can be correlated with geographic locations based on IP address registrations and similar resources. Similarly, the geographic location of the path of the network packets, as well as the timing, date, and medium of the segments of the path can be determined is some embodiments (Block 309). This information can be correlated with weather patterns, network conditions, properties of the media, bandwidth allocation and similar information that may affect the transmission of the network packet along the path between the source and destination. In particular, any information that can affect the viability or network conditions of the path and the video stream can be collected. The collected data including the priority fault information can be collected as a time series of data for further analysis (Block 311). The time series can cover any window relative to the current network packet that is being analyzed. To prevent anomalous data from skewing predictions, any or all of the collected data can be smoothed by averaging, exponential smoothing, or similar techniques.

The video stability predictor can select a set of values of a set of features of the selected network packets consistent with the training of the machine learning model. Any type of machine learning model can be utilized. In some embodiments, a neural network (e.g., a deep learning neural network) or similar machine learning model can be utilized. The machine learning model can be trained on particular types of features and network packets (e.g., priority faults, network performance metrics, and similar features) at any level of granularity. Any provided information about a selected set of network packets can be utilized to select an appropriate trained machine learning model. In some embodiments, a special machine learning model for identifying types of network packets or for use with certain video sources can be utilized as a first step to select a more specifically trained machine learning model.

The trained machine learning model is provided the set of features and/or network packets as input (Block 315). Any number of network packets and any set of features can be selected for input to the trained machine learning model. Features that are selected and identified in the input frames can include priority faults, network performance metrics, source and destination locations, and similar information. The trained machine learning model generates video stability scores based on the input features. The input features can be selected for real time computation or extraction from the network packets and can be derived without significant computational latency such that they can be input into the machine learning model without significant delay to the handling of the network packets.

The video stability score can have a defined range (e.g., 0 to 100) that indicates the level of stability. Similarly, the probability or confidence score can also be generated that estimates the accuracy of the video stability score for the video stream. The video stability score can indicate a prediction of an immediate failure or issue (e.g., a 0 score) or can indicate stability over a prediction window (e.g., a 100 score) or variations thereof. Multiple video stability scores for different windows of time or different aspects of video stability can be generated by a given trained machine learning model or by application of a set of machine learning models.

In some embodiments, the probability or confidence score can be examined to determine whether the applied machine learning model requires retraining or whether a different machine learning model is to be applied. If the probability or confidence score of the video stability scores below a threshold level or outside or set of boundaries for acceptable probability or confidence levels, then the retraining or reselection of the applied machine learning model for generating the video stability scores can be triggered. In some embodiments, a confidence score that is out of bounds for a network packet, a set of network packet, an averaged probability or confidence score over many network packets, or similar metric can be utilized to determine whether the machine learning model is to be retrained or reselected. The retraining of the machine learning model can be similar to the initial training of the machine learning model as further described herein below. The retraining can either update an existing machine learning model or generate a new machine learning model. Retraining can shift the set of features selected for input into the machine learning model.

A check is made after the processing of each set of network packets to determine if there are more network packets to process for the video source (Block 317). As long as the video source is continuing to stream to the destination, then the processing of the video stream can continue (Block 301). If the video stream completes, then the process can end the video stability prediction process.

The video stability cores, probability or confidence scores, and similar information generated by the video stability predictor can be consumed by a video stability manager or other components of the video streaming platform. The information can be utilized to make decisions on video stream handling including reallocation of resources for a given video stream in response to identifying video stability issues in sets of network packets of the video streams. The video stability prediction process can be executed at any point between a video source and the publishing of the content into the content delivery network (CDN) including multiple instances of the video stability predictor that can use a shared set of machine learning models or separate instances and/or separately trained machine learning models to generate the video stability information at different points in the video streaming platform. In particular, the video stability prediction process can be employed at positions in the video streaming platform that can generate video stability information prior to the video processing of the video source to enable the optimal allocation of resource for the video source based on the video stability information prior to being assigned resources.

The video stability prediction process can be used to identify video stability information for individual network packets or sets of network packets and/or to produce video stability information for a video stream in real time or in sufficient real time (e.g., within 1-200 ms). In some embodiments, the video stability prediction process can be applied to determine video stability information for every individual network packet of the video stream. However, in some other implementations, the method can be applied to assess every second/third/fourth/fifth/ . . . /$n^{th}$ network packet of the video stream or similarly spaced batches of network packets.

Figure 4:
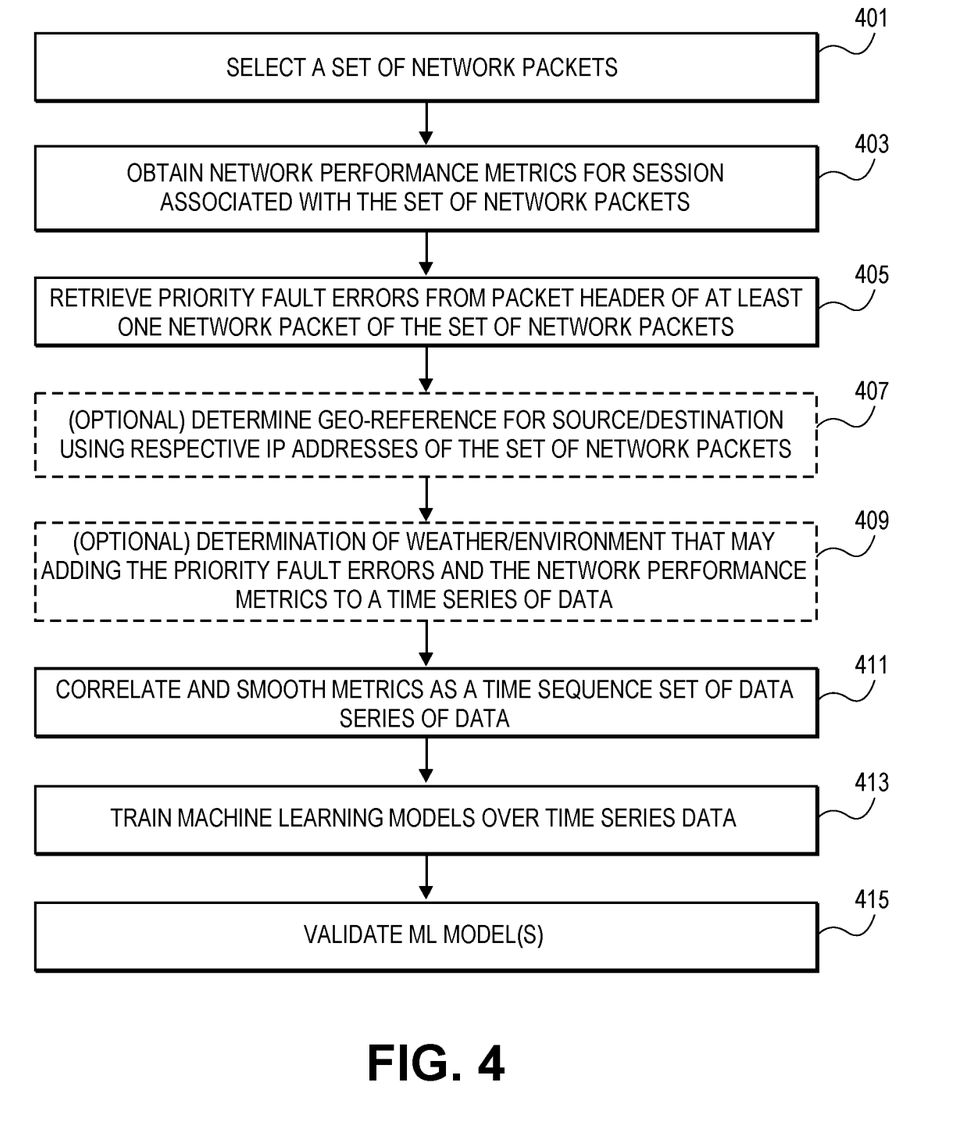
FIG. 4 is a flowchart of one embodiment of a process for training a video stability predictor.

FIG. 4 is a flowchart of one embodiment of a process for training a machine learning model to perform video stability prediction. The illustrated process provides an example process for a video streaming system that includes machine learning training for video stability prediction. The process is illustrated at a high level to represent the overall function of the video streaming system 100. The video streaming system receives media (e.g., a video source or stream) from a content producer or similar video source. The training of the machine learning model can be implemented by the video stability predictor, video stability manager, or any other component such as a separate training component within the video streaming system 100.

The video streaming system 100 receives media (e.g., a video source or stream) from a content producer or similar video source and selects a set of network packets from the session transporting the video source to be processed (Block 401). A sequential processing of the network packets is illustrated by way of example for clarity and conciseness, however, one skilled in the art would appreciate that aspects of the process could be performed in parallel or in alternate order. A network packet can be any type of data encapsulation using any format or protocol. In the example embodiments, the network packets are part of a DVB standardized process. However, the embodiments are also applicable to other similar technologies. The video stream received from content producers can be encoded in any format and can have any size or organization. In some cases, the video stream can be formatted to satisfy legal agreements between content producers and content distributors who stream the media on their platform (e.g., via a content delivery network (CDN)) and/or to meet the technical requirements of the distributors who stream the media on their platform.

Input network packets can be processed individually, in sets, batches, or similar groupings. A set of network performance metrics can be obtained for the session associated with the selected network packets (Block 403). Network performance metrics can be collected from the embedded information in the session, reports from downstream devices, network management software in the video streaming platform, or similar sources. Network performance metrics that are collected can include latency, packet loss, jitter, bandwidth utilization, and similar metrics. Each selected network packet can be inspected to retrieve priority fault errors (e.g., ETR 101 priority faults) or similar information. The ETR 101 priority faults are part of the packet header. The ETR 101 priority faults indicate various errors in the transport stream.

In some embodiments, a source or destination of the network packet is examined to determine a location or geo-reference associated with either or both of the source or destination (Block 407). IP addresses of the source or destination can be correlated with geographic locations based on IP address registrations and similar resources. Similarly, the geographic location of the path of the network packets, as well as the timing, date, and medium of the segments of the path can be determined is some embodiments (Block 409). This information can be correlated with weather patterns, network conditions, properties of the media, bandwidth allocation and similar information that may affect the transmission of the network packet along the path between the source and destination. In particular, any information that can affect the viability or network conditions of the path and the video stream can be collected. The collected data including the priority fault information can be collected as a time series of data for further analysis (Block 415). The time series can cover any window relative to the current network packet that is being analyzed. To prevent anomalous data from skewing predictions, any or all of the collected data can be smoothed by averaging, exponential smoothing, or similar techniques. For training purposes, the time series data can have a long history to better establish patterns for predicting video stability issues.

Once the time series data is collected and prepared, then a set of machine learning models can be trained against the time series data (Block 413). The training process can select a set of values of a set of features of the selected network packets which can be varied for the training of the set of machine learning models. Any type of machine learning model can be utilized. In some embodiments, a neural network (e.g., a deep learning neural network) or similar machine learning model can be utilized. Each machine learning model can be trained on a different set of features and/or network packets (e.g., priority faults, network performance metrics, and similar features) at any level of granularity. Any provided information about a selected set of network packets can be utilized to train a machine learning model.

Any number of network packets and any set of features can be selected for use in training each machine learning model. Features that are selected and identified for the network packets can include priority faults, network performance metrics, source and destination locations, and similar information. The trained machine learning model generates video stability scores based on the input features. The input features can be selected for real time computation or extraction from the network packets and can be derived without significant computational latency such that they can be input into the machine learning model without significant delay to the handling of the network packets.

The video stability score can have a defined range (e.g., 0 to 100) that indicates the level of stability. Similarly, the probability or confidence score can also be generated that estimates the accuracy of the video stability score for the video stream. The video stability score can indicate a prediction of an immediate failure or issue (e.g., a 0 score) or can indicate stability over a prediction window (e.g., a 100 score) or variations thereof. Multiple video stability scores for different windows of time or different aspects of video stability can be generated by a given trained machine learning model or by application of a set of machine learning models.

In some embodiments, the probability or confidence score can be examined to determine whether the applied machine learning model requires retraining or whether a different machine learning model is to be applied. If the probability or confidence score of the video stability scores below a threshold level or outside or set of boundary for acceptable probability or confidence levels, then the retraining or reselection of the applied machine learning model for generating the video stability scores can be triggered. In some embodiments, a confidence score that is out of bounds for a network packet, a set of network packet, an averaged probability or confidence score over many network packets, or similar metric can be utilized to determine whether the machine learning model is to be retrained or reselected. The retraining of the machine learning model can be similar to the initial training of the machine learning model as described above. The retraining can either update an existing machine learning model or generate a new machine learning model. Retraining can shift the set of features selected for input into the machine learning model.

After the set of machine learning models is trained a validation process can be performed (Block 415). The validation process can check whether each machine learning model is operating correctly. Similarly, the machine learning model accuracy can be tested such that those models that have the best performance can be utilized for generating video stability predictions.

The training process can be performed by the video stability predictor, video stability, manager, or specialized training components. The training process can be implemented in any portion of the video streaming platform.

The training process can utilize each individual input network packet or sets of network packets. However, in some other implementations, the training method can be applied to assess every second/third/fourth/fifth/ . . . /$n^{th}$ network packet of the video stream or similarly spaced batches of network packets.

Electronic Devices Implementing Embodiments of the Invention

Figure 5:
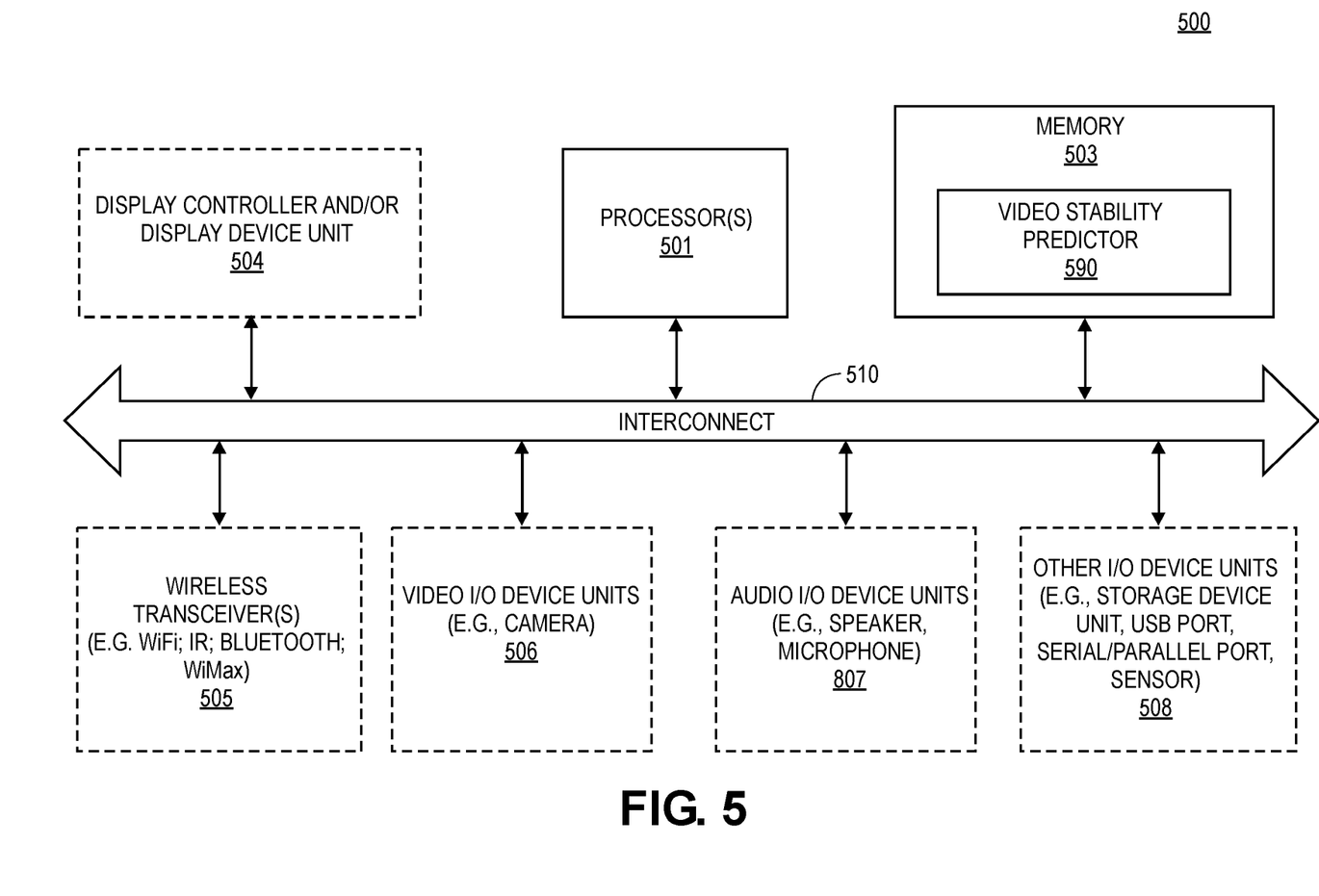
FIG. 5 is a block diagram illustrating an electronic device that may serve as a video stability predictor of a video streaming platform in a cloud computing environment according to one embodiment of the invention.

FIG. 5 is a block diagram illustrating an electronic device that may serve as a video stability predictor of a video streaming platform in a cloud computing environment according to one embodiment of the invention. The electronic device may be a computing device (e.g., a computer server) of a cloud computing environment). The system 500 may represent the video stability predictor 590 and or video stability manager described above performing any of the processes or methods for training machine learning models and applying the trained machine learning models to generate context information in real time in a video streaming system described above. The system 500 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 500 is intended to show a high level view of many components of the computing system. However, it is to be understood that additional components may be present in certain implementations and furthermore, different arrangement of the components shown may occur in other implementations.

In one embodiment, the system 500 includes a processor 501, memory 503, and optionally device units 504-508 that are interconnected via a bus or an interconnect 510. A processor 501 may represent a single processor or multiple processors with a single processor core or multiple processor cores included therein. The processor 501 may represent one or more general-purpose processors such as a microprocessor, a central processing unit (CPU), or processing device. More particularly, the processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 501 may communicate with the memory 503, which in an embodiment can be implemented via multiple memory devices to provide for a given amount of system memory. The memory 503 may include one or more volatile storage (or memory) devices such as random access memory (RAM), dynamic RAM (DRAM), synchronous DRAM (SDRAM), static RAM (SRAM), or other types of storage devices. The memory 503 may store information including sequences of instructions that are executed by the processor 501, or any other device units. For example, executable code and/or data of a variety of operating systems, device drivers, firmware (e.g., input output basic system or BIOS), and/or applications can be loaded in the memory 503 and executed by the processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 503 contains a video stability predictor 590, manager, or related components for training, which may contain instructions to perform the operations of these components as discussed herein above. The video stability predictor 590 and related components may contain functional blocks that implement functions as described herein with relation to the video stability prediction process and related training processes discussed herein above. The processor 501 may instantiate the video stability predictor 590 and related components to perform operations to as discussed herein above.

The system 500 may optionally further include input/output (I/O) devices such as the device units 504-508, including display control and/or display device unit 504, wireless transceiver(s) 505, video I/O device unit(s) 506, audio I/O device unit(s) 507, and other I/O device units 508 as illustrated. The wireless transceiver 505 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 500 may also include an ultrasound device unit (not shown) for transmitting a conference session code.

The video I/O device unit 506 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 507 may include a speaker and/or a microphone to facilitate voice-enabled functions, such as voice recognition, voice replication, digital recording, and/or telephony functions. Other optional devices 508 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 508 may further include certain sensors coupled to the interconnect 510 via a sensor hub (not shown), while other devices such as a keyboard or thermal sensor may be controlled by an embedded controller (not shown), dependent upon the specific configuration or design of the system 500.

The system 500 may be coupled to an orchestrator in an orchestrator as illustrated in FIG. 2. Additionally, the system 500 may be integrated within a streaming platform coordinator 170, similar to the video stability predictor 190 illustrated in FIG. 1. The system 500 may perform methods discussed herein above relating to FIGS. 3 and 4.

Note that while the system 500 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method of measuring video stream visual stability, the method comprising:
    receiving, by one or more processors, a first set of network packets carrying data of a video stream from a video source of a video stream system;
    determining, by the one or more processors, one or more network performance metrics for a session associated with the first set of network packets;
    retrieving, by the one or more processors, one or more features, wherein the one or more features include one or more priority fault errors from a packet header of at least one network packet of the first set of network packets;
    inputting, by the one or more processors, the one or more network performance metrics, the one or more features, and the first set of network packets into a machine learning model to obtain a video stability score for the first set of network packets;
    in response to the inputting, receiving, by the one or more processors, the video stability score indicating a level of stability from the machine learning model; and
    determining, by the one or more processors, at least one resource modification for the video stream system.

2. The method of claim 1, wherein the one or more network performance metrics are collected from embedded information in the session, one or more reports from at least one downstream device, network management instructions, and/or one or more similar sources.

3. The method of claim 1, wherein the one or more network performance metrics include a latency metric, a packet loss metric, a jitter metric, and/or a bandwidth utilization metric.

4. The method of claim 1, the method further comprising:
determining, by the one or more processors, a location and/or a geo-reference for a source and/or a destination of the at least one network packet.

5. The method of claim 4, wherein inputting the one or more features and the first set of network packets into the machine learning model to obtain the video stability score for the first set of network packets comprises:
inputting, by the one or more processors, the location and/or the geo-reference into the machine learning model to obtain the video stability score.

6. The method of claim 1, the method further comprising:
adjusting, by the one or more processors, one or more resources of the video stream system based on the at least one resource modification.

7. The method of claim 1, the method further comprising:
generating, by the one or more processors, a confidence score that corresponds to an accuracy of the video stability score.

8. A computer system for measuring video stream visual stability, the computer system comprising:
a memory having processor-readable instructions stored therein; and
one or more processors configured to access the memory and execute the processor-readable instructions, which when executed by the one or more processors configures the one or more processors to perform a plurality of functions, including functions for:
receiving a first set of network packets carrying data of a video stream from a video source of a video stream system;
determining one or more network performance metrics for a session associated with the first set of network packets;
retrieving one or more features, wherein the one or more features include one or more priority fault errors from a packet header of at least one network packet of the first set of network packets;
inputting the one or more network performance metrics, the one or more features, and the first set of network packets into a machine learning model to obtain a video stability score for the first set of network packets;
in response to the inputting, receiving the video stability score indicating a level of stability from the machine learning model; and
determining at least one resource modification for the video stream system.

9. The computer system of claim 8, wherein the one or more network performance metrics are collected from embedded information in the session, one or more reports from at least one downstream device, network management instructions, and/or one or more similar sources.

10. The computer system of claim 8, wherein the one or more network performance metrics include a latency metric, a packet loss metric, a jitter metric, and/or a bandwidth utilization metric.

11. The computer system of claim 8, the functions further comprising:
determining a location and/or a geo-reference for a source and/or a destination of the at least one network packet.

12. The computer system of claim 11, wherein inputting the one or more features and the first set of network packets into the machine learning model to obtain the video stability score for the first set of network packets comprises:
inputting the location and/or the geo-reference into the machine learning model to obtain the video stability score.

13. The computer system of claim 8, the functions further comprising:
adjusting one or more resources of the video stream system based on the at least one resource modification.

14. The computer system of claim 8, the functions further comprising: generating a confidence score that corresponds to an accuracy of the video stability score.

15. A non-transitory computer-readable medium containing instructions for measuring video stream visual stability, the instructions comprising:
receiving, by one or more processors, a first set of network packets carrying data of a video stream from a video source of a video stream system;
determining, by the one or more processors, one or more network performance metrics for a session associated with the first set of network packets;
retrieving, by the one or more processors, one or more features, wherein the one or more features include one or more priority fault errors from a packet header of at least one network packet of the first set of network packets;
inputting, by the one or more processors, the one or more network performance metrics, the one or more features, and the first set of network packets into a machine learning model to obtain a video stability score for the first set of network packets;
in response to the inputting, receiving, by the one or more processors, the video stability score indicating a level of stability from the machine learning model; and
determining, by the one or more processors, at least one resource modification for the video stream system.

16. The non-transitory computer-readable medium of claim 15, wherein the one or more network performance metrics are collected from embedded information in the session, one or more reports from at least one downstream device, network management instructions, and/or one or more similar sources.

17. The non-transitory computer-readable medium of claim 15, wherein the one or more network performance metrics include a latency metric, a packet loss metric, a jitter metric, and/or a bandwidth utilization metric.

18. The non-transitory computer-readable medium of claim 15, the instructions further comprising:
determining, by the one or more processors, a location and/or a geo-reference for a source and/or a destination of the at least one network packet.

19. The non-transitory computer-readable medium of claim 18, wherein inputting the one or more features and the first set of network packets into the machine learning model to obtain the video stability score for the first set of network packets comprises:
inputting, by the one or more processors, the location and/or the geo-reference into the machine learning model to obtain the video stability score.

20. The non-transitory computer-readable medium of claim 15, the instructions further comprising:
adjusting, by the one or more processors, one or more resources of the video stream system based on the at least one resource modification.

* * * * *